United States Patent
Clifford

(10) Patent No.: US 12,299,074 B2
(45) Date of Patent: May 13, 2025

(54) ACOUSTIC SENSOR PROCESSING

(71) Applicant: Cavnue Technology, LLC, Arlington, VA (US)

(72) Inventor: David Hahn Clifford, Royal Oak, MI (US)

(73) Assignee: Cavnue Technology, LLC, Arlington, VA (US)

( * ) Notice: Subject to any disclaimer, the term of this patent is extended or adjusted under 35 U.S.C. 154(b) by 440 days.

(21) Appl. No.: 17/721,974

(22) Filed: Apr. 15, 2022

(65) Prior Publication Data

US 2023/0334120 A1 Oct. 19, 2023

(51) Int. Cl.
| | |
|---|---|
| *G06V 20/54* | (2022.01) |
| *G06F 18/214* | (2023.01) |
| *G06F 18/25* | (2023.01) |
| *G06T 7/60* | (2017.01) |
| *G06T 7/70* | (2017.01) |
| *G06T 7/90* | (2017.01) |
| *H04R 1/08* | (2006.01) |

(52) U.S. Cl.
CPC ........ *G06F 18/2148* (2023.01); *G06F 18/251* (2023.01); *G06T 7/60* (2013.01); *G06T 7/70* (2017.01); *G06T 7/90* (2017.01); *G06V 20/54* (2022.01); *H04R 1/08* (2013.01); *G06T 2207/10024* (2013.01); *G06T 2207/20081* (2013.01); *G06T 2207/30248* (2013.01)

(58) Field of Classification Search
CPC ... G06T 7/70; G06T 7/90; G06T 2207/20081; G06T 2207/30236; G06T 2207/30252; G06V 20/54

USPC ............... 382/103, 104, 106, 107, 155, 156
See application file for complete search history.

(56) References Cited

U.S. PATENT DOCUMENTS

| | | | |
|---|---|---|---|
| 2011/0175755 | A1 | 7/2011 | Yoshioka et al. |
| 2014/0232566 | A1 | 8/2014 | Mimeault et al. |
| 2017/0103656 | A1 | 4/2017 | Cummings, II et al. |
| 2018/0096595 | A1* | 4/2018 | Janzen .................... G06V 10/94 |
| 2021/0209949 | A1* | 7/2021 | Hisanaga ................. G08G 1/16 |

(Continued)

OTHER PUBLICATIONS

Chao Gao "Road Traffic Detection Using Wireless Noise Sensors"; IEEE ICC 2012, pp. 757-761 (Year: 2012).*

(Continued)

*Primary Examiner* — Jamares Q Washington
(74) *Attorney, Agent, or Firm* — Fish & Richardson P.C.

(57) ABSTRACT

Methods, systems, and apparatus, including computer programs encoded on computer storage media, for monitoring vehicles traversing a roadway using acoustic sensors. In some implementations, a server obtains data from an acoustic sensor monitoring road actors traversing a roadway at a first location. The server obtains data from an imaging sensor monitoring the road actors traversing the roadway at a second location. The server generates correlation data using the data from the acoustic sensor and the data from the imaging sensor. The server determines observations of the road actors traversing the roadway using the data from the acoustic sensor and the data from the imaging sensor. The server trains a machine-learning model to estimate characteristics of the road actors using the correlation data and the determined observations of the road actors from the imaging sensor and the acoustic sensor.

19 Claims, 4 Drawing Sheets

(56) References Cited

U.S. PATENT DOCUMENTS

2021/0318691 A1    10/2021  Amini et al.
2022/0260458 A1*   8/2022   Mian ..................... G01N 21/95

OTHER PUBLICATIONS

Hu et al., "A multirange vehicle speed prediction with application to model predictive control-based integrated power and thermal management of connected hybrid electric vehicles," Journal of Dynamic Systems, Measurement and Control, Jan. 2022, 144(011105):1-11.

* cited by examiner

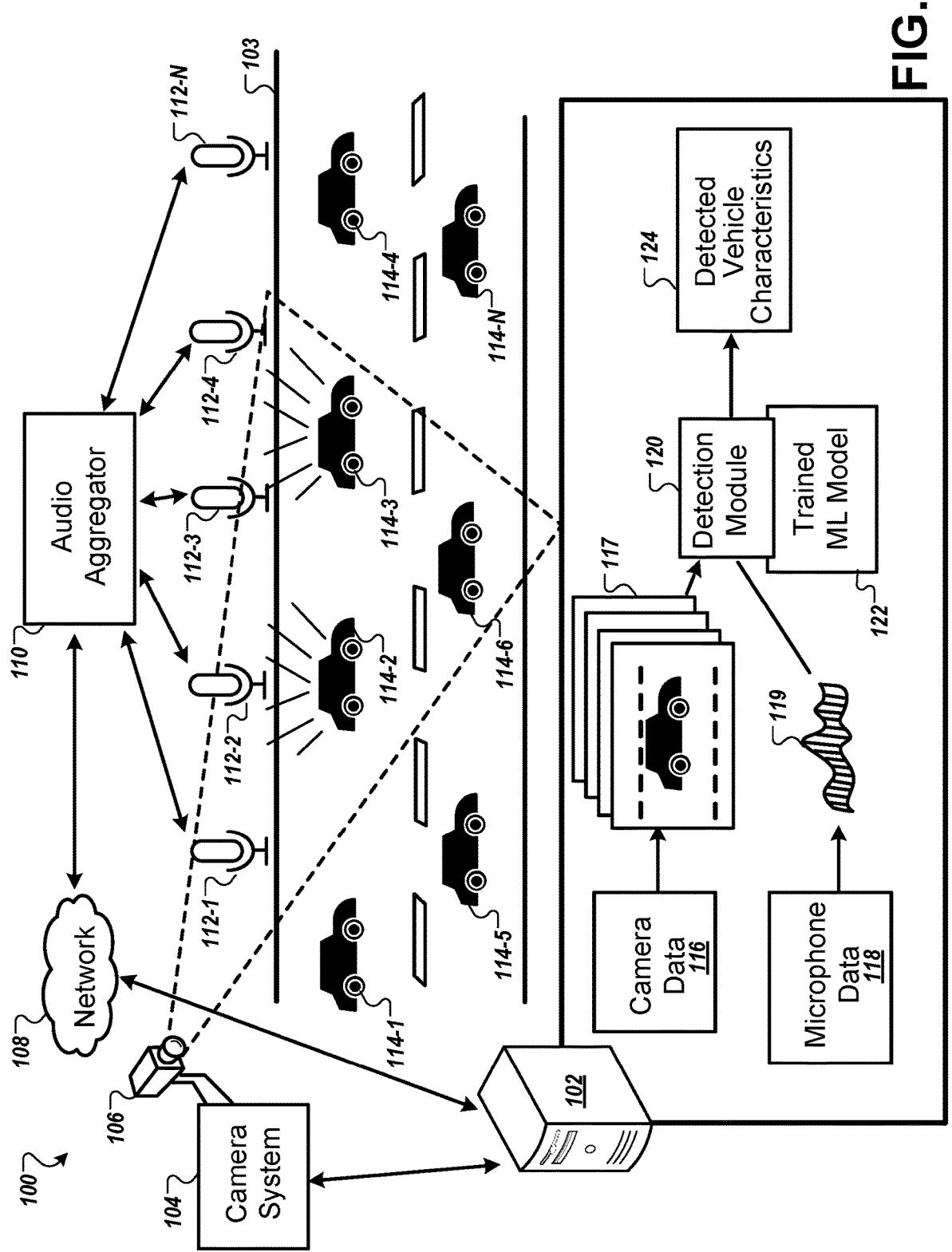

ACOUSTIC SENSOR PROCESSING

TECHINCAL FIELD

This specification generally relates to monitoring vehicles traversing a roadway, and one particular implementation relates to monitoring vehicles traversing a roadway using acoustic devices.

BACKGROUND

Vehicles can travel on roadways, highways, and backroads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

The subject matter of this application describes a system that can monitor one or more vehicles traversing a roadway using acoustic devices. The system can include a server that can obtain sensor data from the acoustic devices and determine characteristics of the traversing vehicles. The server can also receive sensor data from other devices that monitor the vehicles traversing the roadway. These other devices can include, for example, RADAR, Lidar, cameras, and other imaging devices. The server can use the sensor data from both the acoustic and imaging devices to determine the characteristics of the traversing vehicles, which can include, for example, vehicle speed, vehicle identification, mechanical components of the identified vehicle, lane congestion, wrong way driving, a number of vehicles on the road, and other characteristics.

In some cases, maintenance on a roadway is typically performed based on how vehicles traverse that roadway. In order to determine the type of maintenance to be performed, characteristics of the vehicles traversing the roadway are monitored over a period of time to understand how the vehicles affect the roadway, such as which vehicle speeds are more likely to create road potholes or characteristics of vehicle turns that create undulations in a flat roadway surface. These vehicle characteristics can be measured via direct observation through various imaging devices. However, these imaging devices require high computational ability, large amounts of power, and high cost to operate and supply reliable results. The system described in this specification can offset the expensive computational requirements of the imaging devices by relying on acoustic devices to aid in and augment imaging devices in estimating vehicle characteristics. Acoustic devices use low power, require minimal costs, and can be placed along a roadway with little difficulty and maintenance. The acoustic devices can intrinsically measure mechanical vibration via pressure waves received from vehicles and other objects traversing the roadway. The acoustic devices can provide data indicative of the measured mechanical vibration to the server for processing to produce characteristics of the vehicles traversing the roadway and make other determinations. Moreover, the sensor data generated by the acoustic devices can augment the sensor data generated by the imaging devices.

The acoustic devices can be embedded in a roadway or placed adjacent to roadside surfaces. The acoustic devices can be placed at predetermined distances apart from one another to ensure each of the acoustic devices can properly identify a moving vehicle. The server can use the data received from the acoustic devices to make determinations about the roadway, determine characteristics of vehicles traversing the roadway, determine where occlusions may exist on the roadway, and trigger other sensors to perform a function. In some implementations, the server can augment the sensor data received from the acoustic devices with the sensor data received from the imaging devices to improve the overall monitoring capabilities of the server. In these cases, the system can combine sensor data from the various acoustic and imaging devices to create a set of joint observations.

The set of joint observations can be cross correlations between data provided by the acoustic devices and the image devices. The server can analyze and process the joint observations to identify, monitor, and characterize the vehicles traversing the roadway. In one such example, a microphone positioned at the side of the road may detect a noise produced by an engine of a vehicle and a camera may record images of the vehicle on the roadway. The server can then specifically identify a vehicle and its type based on the noise recorded from the microphone and the images recorded from the camera. Additionally, detection from one set of sensors may trigger the use of other sensors. In another example, acoustic data indicating the excessive speeding of a vehicle may trigger a camera to turn on and capture images of a roadway in a specific area. Other examples are also possible and will be described below.

In some implementations, the server can train a machine-learning model using the data identified in the set of joint observations. The machine-learning model can be trained to identify vehicle characteristics using acoustic information alone. The server can pair the acoustic data with imagery data from a similar location on the road to enable the machine-learning model to make determinations about the one or more vehicles in the area of the roadway. For example, the acoustic data can illustrate a sound profile of a vehicular crash. The imagery data can confirm the vehicular crash and the system can train the machine-learning model to identify a vehicular crash from the sound profile alone. In another example, the acoustic data can illustrate a sound profile of a truck with three axles. The imagery data can illustrate a type of the truck and an indication that the truck has three axles. In response, the machine-learning model can be trained to identify a truck with three axles based on the sound profile from the acoustic data alone. The trained machine-learning model can also produce meaningful characteristics of the vehicles based on the acoustic data alone in locations where the field of view of the cameras are not currently monitoring.

In some implementations, one or more surface deformations can be introduced on a roadway to induce a specific audio signal. The surface deformations can be any bump, crevice, repetitive deformation, non-repetitive deformation, flat surface, undulating surface, other deformations, or any combination of the above that induces a specific audio signal. A microphone can be embedded in the roadway proximate to the surface deformation or placed next to the surface deformation on the roadway. When a vehicle or object traverses over the surface deformation, an audio signal will be induced that can be recorded by the acoustic devices. The acoustic devices can provide the audio signal to the server to make determinations about the vehicle that traversed over the surface deformation. For example, the server can compare the audio signal to stored audio signals to identify characteristics of the vehicle. Additionally, the server can perform one or more signal processing techniques on the obtained audio signal to enhance the signal, remove noise, isolate specific components of the obtained audio signal, compare with other audio signals, and identify vehicle characteristics with the obtained audio signal. For example, the server may count a number of vehicles, identify a type of engine of the vehicle, identify a vehicle, count a number of mechanical axles in a vehicle, identify a speed of a vehicle, and other characteristics.

In some implementations, the system can perform active monitoring of vehicles traversing a roadway. Specifically, the one or more speakers can be embedded in the roadway or placed adjacent to each of the acoustic devices. Each speaker can broadcast noise in a specific direction and the acoustic devices can record the mechanical vibration received from the noise that reverberated off one or more objects from the roadway. Then, the server can measure a difference between the transmitted noise and the received noise and assess characteristics about the directionality of the sound wave proportional to the directionality of the noise blanket that saturates various areas of the roadway. As a result, the system can assess the resultant vector or resultant pressure wave to make determinations about the directionality of vehicle movement. For example, the server can assess the resultant vector to make determinations about vehicles driving in the wrong direction, the same direction, and speed of those vehicles.

In one general aspect, a method is performed by a server. The method includes: obtaining, by one or more processors, data from an acoustic sensor monitoring road actors traversing a roadway at a first location; obtaining, by the one or more processors, data from an imaging sensor monitoring the road actors traversing the roadway at a second location; generating, by the one or more processors, correlation data using the data from the acoustic sensor and the data from the imaging sensor; determining, by the one or more processors, observations of the road actors traversing the roadway using the data from the acoustic sensor and the data from the imaging sensor; and training, by the one or more processors, a machine-learning model to estimate characteristics of the road actors using the correlation data and the determined observations of the road actors from the imaging sensor and the acoustic sensor.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein the first location is different from the second location.

In some implementations, the method includes wherein the first location is similar to the second location.

In some implementations, the method includes wherein obtaining data from the acoustic sensor monitoring the road actors further includes: receiving, by the one or more processors, first acoustic data from a first acoustic sensor at a first time; and receiving, by the one or more processors, second acoustic data from a second acoustic sensor at a second time.

In some implementations, the method includes wherein a difference between the first time and the second time represents (i) a distance between the first acoustic sensor and the second acoustic sensor on the roadway and (ii) a speed at which the road actor moves on the roadway between the first acoustic sensor and the second acoustic sensor.

In some implementations, the method includes the first acoustic data represents a sound profile of the road actor at the first time and the second acoustic data represents the sound profile of the road actor at the second time.

In some implementations, the method includes wherein the imaging sensor comprises at least one of a LIDAR system, a RADAR system, and a camera.

In some implementations, the method includes wherein determining the observations of the road actors using the data from the imaging sensor and the acoustic sensor further includes: determining, by the one or more processors, a sound profile for each of the road actors traversing the roadway; determining, by the one or more processors, a location for each of the road actors in the data from the imaging sensor; determining, by the one or more processors, a color for each of the road actors in the data from the imaging sensor; and determining, by the one or more processors, a size for each of the road actors in the data from the imaging sensor.

In some implementations, the method includes wherein generating the correlation data using the data from the acoustic sensor and the data from the imager sensor further includes: generating, by the one or more processors, joint correlation data for modeling an environment of the road actors traversing the roadway using (i) the data from the acoustic sensor at the first location, (ii) the data from the imaging sensor at the second location, and (iii) the observations of the road actors traversing the roadway, the joint correlation data indicating (i) first characteristics of the road actors at the first location not in a field of view of the imaging sensor, (ii) second characteristics of the road actors at the second location not in a field of view of the acoustic sensor, and (iii) third characteristics of the road actors at a third location in a field of view of both the acoustic sensor and the imaging sensor.

In some implementations, the method includes wherein training the machine-learning model to estimate the characteristics of the road actors using the correlation data and the determined characteristics of the road actors from the imaging sensor and the acoustic sensor further includes: training, by the one or more processors, the machine-learning model to estimate characteristics of the road actors in a location where the imaging sensor cannot view the roadway.

In some implementations, the method includes estimating, by the one or more processors, the characteristics of the road actors on the roadway by providing data from the acoustic sensor to the trained machine-learning model.

In some implementations, the method includes wherein the characteristics of the road actors include at least one of a number of axles in a road actor, a speed of the road actor, an acceleration of the road actor, a congestion of the roadway, and a number of road actors at the first location and the second location.

The subject matter described in this specification can be implemented in various embodiments and may result in one or more of the following advantages. In some implementations, the system can improve an overall reliability and accuracy of the estimated vehicle characteristics. For one, by relying on both acoustic and imaging devices, the system can improve its modeling of a roadway by estimating vehicle characteristics of vehicles in areas unseen by cameras. The system can depend upon the acoustic sensors to capture acoustic noises created by vehicles to augment the monitoring of the roadway.

In some implementations, the system can rely on a machine-learning model to estimate vehicle characteristics from acoustic information alone. For example, the system can train the machine-learning model on joint observations, e.g., acoustic data and imaging data of portions of a roadway, to produce estimated vehicle characteristics from acoustic information alone. This can lead to a reduction in the amount of data required to estimate vehicle characteristics, since audio data alone can be minimal when compared to imaging data. Therefore, the system can store smaller data sets associated with acoustic data for estimating vehicle characteristics than the larger data sets typically accompanied by imaging data. Moreover, the system can utilize the machine-learning model to not only identify vehicle characteristics but to further identify vehicle applications, such as vehicles driving in different directions than the roads' intended direction, as well as vehicle accidents. The trained machine-learning model can greatly enhance the detection capabilities of this system by relying solely on acoustic information to estimate vehicle characteristics.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1C are block diagrams that illustrate example systems for monitoring vehicles traversing a roadway using acoustic and imaging devices.

Like reference numbers and designations in the various drawings indicate like elements.

DETAILED DESCRIPTION

Figure 1B:
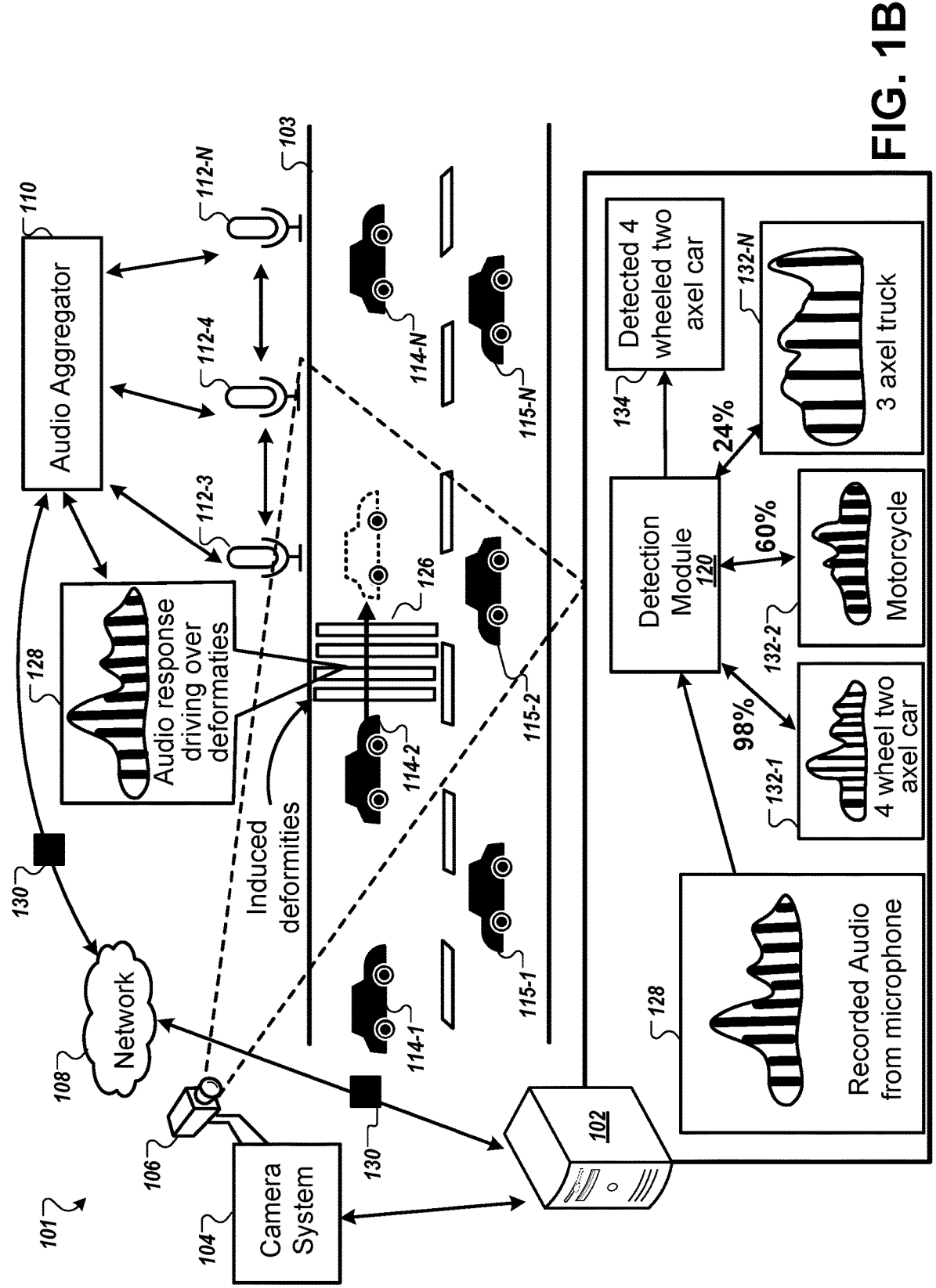

FIG. 1A is a block diagram that illustrates an example system 100 for monitoring vehicles traversing a roadway using acoustic and imaging devices. The system 100, deployed on a roadway 103 on which vehicles 114-1 through 114-N (collectively "vehicles 114") travel, includes a plurality of acoustic devices 112-1 through 112-N (collectively "acoustic devices 112"), a network 108, and a central server 102. The system 100 also includes a camera 106 monitoring a specific portion of the roadway 103 and can include additional cameras covering various portions of the roadway 103.

The example system 100 illustrates five acoustic devices 112, but more or fewer acoustic devices are also possible. Additionally, the roadway 103 is shown with two lanes showing vehicles traveling in a single direction. However, the roadway 103 may alternatively include one lane of vehicles traveling in the same direction, more than two lanes of vehicles traveling in the same direction, or more than one lane having vehicles travel in opposing directions.

In general, the system 100 can provide techniques for monitoring vehicles on the roadway 103 using various devices. Generally, these devices, which can be sensor devices, can obtain sensor data regarding a particular vehicle or road actor moving along the roadway 103. The system 100 can generate and monitor sensor data that can not only describe the road actors but can also illustrate by way of a representation of the vehicles in a lane, the speed of those vehicles, and the relationship of those vehicles to one another. Some examples of the road actors that the system 100 can detect, identify, and monitor can include a vehicle, such as a car, a semi-truck, a motorcyclist, and even a bicyclist. The system can also identify a person that may be moving along the roadway 103, such as along the sidewalk of the roadway 103, or crossing the roadway 103. The system 100 can also identify other objects that present itself on the roadway 103, such as a pet, an obstruction that may impede the flow of traffic, or an erratic vehicle driving in an opposite direction to the flow of traffic.

As illustrated in system 100, the sensors can be used to monitor vehicles traversing the roadway 103. The sensors can monitor a portion of the roadway 103 based on their respective field of view, or respective noise profile if the sensor relies on auditory characteristics. As mentioned, the sensors can include acoustic and imaging devices. The sensors can include, for example, a LIDAR system, a video camera, a radar system, a Bluetooth system, and a Wi-Fi system, to name a few examples. Moreover, the sensors can include a microphone, a speaker, an infrared camera, or any other type of sensor.

In some implementations, a single device can include one sensor or a combination of sensors. For example, the acoustic device 112-1 can include a microphone, a speaker, and a LIDAR system. In another example, the acoustic device 112-2 can include a microphone, a video camera, a radar system, and a Wi-Fi system. Other device configurations are also possible.

In some implementations, these sensors can obtain sensor data of objects on the roadway 103 through their respective field of view. Each sensor can have a field of view set by a designer of system 100. For example, if the camera 106 corresponds to a video camera, then the field of view of the video camera can be based on the type of lens used, e.g., wide angle, normal view, and telephoto, for example, and the depth of the camera field, e.g., 20 meters, 30 meters, and 60 meters, for example.

In another example, if the camera 106 corresponds to a LIDAR system, the parameters required for use would include the point density cloud, e.g., a distribution of the point cloud, field of view, e.g., angle in which the LIDAR sensor can view an area, and a line overlap, e.g., a measure to be applied that affects ground coverage. In another example, if the acoustic device 112-1 includes a microphone, then the microphone can include an audible decibel range between the hearing frequencies of 20-20,000 Hertz (Hz), to name one example.

The field of view of each sensor becomes important when monitoring vehicles traversing a roadway because the system 100 can be designed in a variety of ways to enhance monitoring road actors on the roadway 103. For example, a designer may seek to overlap fields of view of adjacent sensors to ensure continuity for viewing the roadway 103 in its entirety. Additionally, overlapping fields of view regions may facilitate monitoring areas where objects enter the roadway 103 through vehicle on-ramps or exit the roadway 103 through vehicle off-ramps. In an example, the designer of system 100 may decide not to overlap the fields of view of adjacent sensors but rather, juxtapose the fields of view of adjacent sensors to ensure the widest coverage of the roadway 103. In this manner, the system 100 can monitor and track more vehicles at a time.

In another example, the designer of system 100 may place acoustic devices in areas where cameras cannot visually see portions of the roadway 103. Specifically, if roadway 103 traverses through a tunnel, under a bridge, or in a parking garage, the designer may place one or more acoustic devices in these covered areas because cameras have difficulty being placed in such areas. As such, a designer has the flexibility of choosing which sensor device to place on the roadway 103 depending on its geographic constraints.

In addition, each sensor can include can include memory and processing components for monitoring the objects on the roadway 103. For example, each sensor can include memory for storing software that (i) performs obtaining sensor data, (ii) processing the obtained sensor data, (iii) communicating with different sensors over network 108 placed on the roadway 103, and (iv) communicating with different backend devices over network 108, to name a few examples. The processing components can include, for example, video processing, acoustic processing, command and control processing, and components for communication capabilities. For example, each of the sensors can also communicate with one another of the network 108. The network 108 may include a Wi-Fi network, a cloud network, a cellular network such as Fiber, 4G, or 5G, a Bluetooth network, or some other communicative medium, e.g., hard-wired or wired.

In some implementations, the acoustic devices can record sensor data in the system 100. Specifically, the acoustic devices can record acoustic information, e.g., sounds, pressure waves, etc., of noises that are created in system 100. Vehicles 114 driving on roadway 103, people and pets walking alongside the roadway 103, vehicle crashes, and other transportation actions can be recorded by the acoustic devices 112. The acoustic devices 112 can record audible noises on a continuous basis, on a periodic basis, or as instructed by the central server 102. In response to recording audio of the vehicles 114 on the roadway 103, the acoustic devices 112 can transmit the recorded audio to an audio aggregator 110.

Each of the sensors in system 100 can also communicate with local devices. For example, as illustrated in system 100, the acoustic devices 112 can communicate with an audio aggregator 110. The audio aggregator 110 can include a server, a computer, a processing device, or another computer component that communicates with the acoustic devices 112 over network 108. The audio aggregator 110 may include one or more computers or servers and one or more databases connected locally or over a network.

The audio aggregator 110 can communicate with the acoustic devices 112 to obtain their recorded information and even can relay data from one acoustic device, e.g., acoustic device 112-1, to another acoustic device, such as acoustic device 112-N. Similarly, the audio aggregator 110 can broadcast acoustic information from one acoustic device, e.g., acoustic device 112-1, to a specified set of acoustic devices, e.g., acoustic devices 112-2 through 112-N.

The audio aggregator 110 can also communicate with a central server 102 over the network 108. The audio aggregator 110 may transmit the acoustic information from each of the acoustic devices 112 to the central server 102 over network 108 because the acoustic devices 112 may not include the necessary equipment to transmit the acoustic information over a long range to the central server 102. In some implementations, the acoustic devices 112 can bypass the audio aggregator 110 and transmit the acoustic information to the central server 102 over network 108 with the proper communications equipment.

In some implementations, the camera 106 can communicate with a camera system 104. The camera system 104 can include a server, a computer, a processing device, or another computer component that communicates with the camera system 104 over network 108. Moreover, the camera system 104 may include one or more computers or servers and one or more databases connected locally or over a network.

The camera system 104 can communicate directly with camera 106 over network 108, communicate directly with multiple cameras in system 100, and broadcast camera data between various cameras. The camera system 104 can transmit the camera information obtained from each camera device to the central server 102 over network 108. In some implementations, the cameras in system 100 can bypass the camera system 104 and communicate the camera information to the central server 102 over network 108 with the proper communications equipment.

In some implementations, the central server 102 can include one or more servers and one or more databases connected locally or over a network. The central server 102 can store data that represents the sensors in the system 100. For example, the central server 102 can store data that represents the sensors that are available to be used for monitoring. This data can indicate which sensors are inactive, the type of data recorded by each sensor, data representing a field of view of each sensor if permissible, and a location of the sensor on the roadway 103.

Additionally, the central server 102 can store data identifying each of the sensors such as, for example, IP addresses, MAC addresses, and preferred forms of communication to each particular sensor. The data can also indicate the relative positions of the sensors in relation to one another. This can include locations of the acoustic devices 112, the camera devices, and other devices. In this manner, a designer can access the data stored in the central server 102 to learn which sensors are being used to monitor vehicles traversing the roadway 103 and pertinent information relevant to each of the sensors.

Moreover, the central server 102 can store sensor data from each of the devices monitoring vehicles traversing the roadway 103 in system 100. The central server 102 may include one or more databases that can store audio samples recorded from the acoustic devices 112, data from the video cameras, such as camera 106, and data from the other cameras. The central server 102 can store the data recorded by each of the sensors from a previous time period, e.g., historical data, and use the historical data for a variety of purposes.

In some implementations, the central server 102 can train a machine-learning model to identify and estimate vehicle characteristics from the obtained sensor data. For example, the central server 102 can train the machine-learning model to produce estimated vehicles characteristics from the acoustic information alone. The training can be performed by pairing together camera data, audio data, and label data that indicate some vehicle characteristic and providing the data as input to a machine-learning model.

As will be further described below, the machine-learning model can be trained to produce an estimated vehicle characteristic or characteristics from solely the acoustic audio information. The central server 102 can compare the output from the trained machine-learning model to a threshold value to improve the accuracy of the machine-learning models estimation. Similarly, the central server 102 can retrain a trained machine-learning model with sensor data, e.g., video and/or acoustic information, if its accuracy falls below a threshold value, or based on feedback information.

In some implementations, the central server 102 can use the obtained sensor data and the trained machine-learning model to develop a joint estimation space for estimating vehicle characteristics on the roadway 103. In particular, the central server 102 may include processing techniques that can detect and identify characteristics of vehicles in the camera data. For example, the processing techniques can include one or more classifiers, one or more object detection algorithms that include various machine-learning algorithms, e.g., neural networks, and other image processing techniques.

The central server 102 can apply the processing techniques to estimate observable properties of the vehicles, e.g., object color, as represented by Red-Green-Blue (RGB) characteristics, the object size, as calculated through analytics in the optical characteristics, and a volume of the object. The central server 102 can apply these processing techniques to individual frames of images and also across various images. By analyzing enabling the processing across various images, the central server 102 can estimate vehicle movement, such as speed and acceleration, vehicle direction, and other characteristics of the vehicles.

Moreover, the central server 102 can augment the camera information with the acoustic information obtained from the acoustic devices 112. The combined camera information augmented with the acoustic information creates this joint estimation space. The central server 102 can use this joint estimation space created from the combined camera information and the acoustic information to enhance a detection capability. Moreover, the joint estimation space can be used to provide detection capabilities in areas of the roadway 103 where one of the sensors cannot provide sensor information.

For instance, the central server 102 can use the acoustic information to identify various characteristics of the vehicle. The central server 102 may store audio profiles or noise profiles that represent specific characteristics of vehicles. The acoustic information can include recorded sounds from one or more acoustic devices 112. The acoustic information can include a sound that lasts for 10 seconds, for example, and was recorded at a high sample rate, e.g., 48 KHz or greater. Additionally, the acoustic information can be time-stamped and sequentially ordered by the audio aggregator 110. In this manner, the 10 second sound may include 2 seconds of audio information recorded by each of the acoustic devices 112-1 through 112-N, where N is five, for this example. The 10-second sound may include sounds from each of the acoustic devices 112 as vehicle 114-2 drives past each of the acoustic devices 112.

The central server 102 can analyze the 10-second sound clip and perform one or more audio processing techniques to identify specific characteristics of vehicles and estimate characteristics of those vehicles. For example, the central server 102 can perform filtration on the sound clip to reduce a noise amount, up sample the sound clip to improve its audio quality for improved detection techniques, and filtering on specific components of the audio signal to reduce the amount of audio to be processed. Moreover, the central server 102 can perform various signal-processing techniques, speech recognition techniques, extract specific frequency components from the audio signal, e.g., using Mel-Frequency Cepstral Coefficients (MFCCs), perform various Fourier transforms, and apply extracted components of the signal to Hidden Markov Models, and automated speech recognition algorithms, to analyze specific characteristics of the audio signal. Based on the extracted frequency components, the central server 102 can take actions to characterize the audio components.

The central server 102 can compare the obtained audio component to the stored noise profiles. For example, the central server 102 can store a 2-second audio sound bite of a truck with 3 axles moving, a 2-second audio sound bite of a sedan moving, a 2-second audio sound bite of an electric vehicle moving, and a 2-second sound bite of a motorcycle moving, to name a few examples. The central server 102 can compare the obtained sound bite or audio snippet with each of the stored noise profiles. Based on a percent match between the comparisons, the central server 102 may identify a type of the vehicle identified by the obtained audio and estimate characteristics of that vehicle.

In another example, the central server 102 can provide the obtained audio clip as input to the trained machine-learning model. In response, the trained machine-learning model can output an indication or a likelihood representing a particular vehicle. For example, the likelihood can indicate the sound represents a 95% likelihood of a truck with 2 axles, a 10% likelihood of a sedan, and a 5% likelihood of a motorcycle. The central server 102 can compare the output likelihood to a threshold value to improve the detection accuracy of the trained machine-learning model. Other examples are also possible.

Based on these determinations, the central server 102 can augment the vehicle estimations made using the camera information with the vehicle estimations made using the acoustic information. This can be beneficial in areas where at least one of the sensors is not currently monitoring or unable to monitor the roadway 103. For example, as illustrated in system 100, camera 106 can monitor an area of the roadway 103 that covers areas similarly monitored by acoustic devices 112-1 through 112-4. However, the field of view of camera 106 falls short of an area monitored by the acoustic device 112-N. In this case, the area on roadway 103 proximate to the acoustic device 112-N is only monitored by the acoustic device 112-N. Thus, the central server 102 can rely on a joint estimation space between (i) overlapping regions monitored by camera 106 and acoustic devices 112-1 through 112-4 and (ii) non-overlapping regions monitored by acoustic device 112-N alone, to estimate characteristics of vehicles along the roadway 103. The joint estimation space can be a modeled environment that estimates vehicle characteristics in real time or after the vehicles have traversed a particular area.

As illustrated in system 100, vehicles 114 traverse down roadway 103. When the camera 106 detects a particular object or objects in its field of view, the camera 106 can generate data that uniquely identifies a particular object in the field of view based on its observable features. Specifically, the camera 106 can generate data features representing various detectable features of the identified object and can combine the data features into a single data unit called an Object Identification Characteristic (OIC), which uniquely identifies that object to other camera sensors and to the central server 102. The OIC may be a unique representation, e.g., hexadecimal value or a string, which describes the observable properties of the object. As previously mentioned, the observable features can include the object color, the object size, the object class, and the volume of the object.

In some implementations, the camera 106 can generate unique identifications for detected objects on a frame-by-frame basis. For example, the camera 106 can identify a first object and a second object in a first frame of data. Then, in the second frame, the camera 106 can identify a first object, then a second object, and then a third object that just entered the field of view (which was not detected in the first frame). In this case, the camera 106 can generate a list for the first frame that includes an OIC for the first object and an OIC for the second object. The camera 106 can also add a timestamp to the first frame to indicate when and for which frame the list was created. Similarly, the camera 106 can generate a list for the second frame that includes an OIC for the first object, an OIC for the second object, and an OIC for the third object. In this manner, the camera 106 can generate a list that includes identified objects for each frame of data, even when objects exit a field of view of the camera 106.

In some implementations, a camera of system 100 transmits the list of OIC information for each identified object to other sensors. In response to generating a frame with one or more OICs, a camera of system 100, e.g., camera 106, can transmit the list of one or more OICs to other sensors, e.g., cameras, microphones, speakers, and other sensors. In some implementations, the other sensors can receive the list and generate their own list of OICs for each respective frame. The other sensors can compare the OICs in the received list to their own generated OICs to see if they are seeing similar vehicles or similar objects on the roadway 103. This process may repeat for each sensor monitoring the roadway 103. In some implementations, the other sensors can receive the list and take actions to obtain sensor data in response to receiving the list.

In some implementations, the camera 106 can transmit the frame with the one or more OICs to the central server 102. Each time a camera 106 generates a frame with the one or more OICs representative of objects in the field, the camera 106 can transmit the frame with the one or more OICs to the central server 102 over network 108. In some implementations, the camera 106 can transmit the frame to the camera system 104. The camera system 104 can acquire the frames with their respective OICs from each camera and transmit the camera data, e.g., camera data 116, to the central server 102 over the network 108. The camera data 116 can include one or more frames 117 of data with their respective OICs from each of the cameras in system 100.

Similarly, as vehicles 114 traverse down roadway 103, the vehicles 114 emit sounds. The sounds can come from the vehicles' engines, tires, tail pipes, and speakers playing music, to name some examples. Additionally, the sounds can come from how vehicles navigate through wind, rain, or other inclement weather as they traverse down the roadway 103. The microphones 112 positioned along the roadway 103 can capture these sounds from the roadway 103 and convert the sound into electrical signals. The electrical signals can then be provided to the audio aggregator 110 and the central server 102 as microphone data 118 for subsequent processing.

In some implementations, a designer of system 100 can insert the acoustic devices 112 along a side of the roadway 103 at a predetermined spacing from one another. For example, acoustic device 112-1 can be 200 meters apart from acoustic device 112-2, acoustic device 112-2 can be 200 meters apart from microphone 112-3, and so on. The acoustic devices 112 can be spaced apart from one another based on a distance the acoustic devices 112 can pick up sounds. Additionally, the acoustic devices 112 can be close and face the roadway 103 to record sounds generated by the road actors on the roadway 103.

In some implementations, the acoustic devices 112 can be spaced apart based on one or more optimization algorithms.

For example, the central server 102 can determine that the acoustic devices 112 are to be spaced apart based on a prevailing speed of the roadway 103. If the prevailing speed of the roadway 103 is high, then the central server 102 can determine that the acoustic devices 112 are to be spaced apart at a greater distance than if the prevailing speed of the roadway 103 is low. In some examples, the optimization algorithms can analyze the acoustic properties of the acoustic devices 112 and produce a spacing amount between the acoustic devices 112 so the acoustic properties, e.g., field of listening, overlap or juxtapose one another.

The acoustic devices 112 can be set to various modes of detection. In some implementations, the acoustic devices 112 can constantly record audio of vehicles traversing the roadway. In this mode, the acoustic devices 112 are always active and record audio in a continuous fashion. However, this mode may require large amounts of storage requirements, which may be housed in the audio aggregator 110.

In some implementations, each of the acoustic devices 112 may operate in a low powered mode. In the low powered mode, a microphone, e.g., acoustic device 112-1, may turn on and begin recording in response to detecting an audible noise above a threshold value, e.g., 3 decibels (dBs). The microphone may turn off after the audible noise drops below the threshold value. In this mode, the microphones preserve power and still have the capability to record audio on the roadway 103.

In some implementations, each of the acoustic devices 112 may operate in an instructional mode. In the instructional mode, a microphone, e.g., acoustic device 112-1, may remain off until a microphone receives an instruction from a sensor to turn on from a previous sensor. For example, a camera 106 may be positioned at a first location along the roadway 103 and acoustic device 112-1 may be positioned at a second location along the roadway 103, where the first location is at a location prior to the second location along the direction of traffic on roadway 103. Moreover, the camera 106 and the acoustic device 112-1 may be positioned along the roadway 103 such that no other sensors are positioned between the two sensors, e.g., camera 106 and acoustic device 112-1 may be 200 meters apart.

In this example, camera 106 may detect one or more objects in its field of view, generate a list of OICs for those detected objects, and transmit the list of OICs to the next sensor subsequently down the line of the roadway along the direction of traffic, which is the acoustic device 112-1. In response to receiving the list of OICs from the camera 106, the acoustic device 112-1 can turn on and capture audio of vehicles traversing the roadway. The acoustic device 112-1 can obtain audio of the same one or more vehicles traversing the roadway that was captured by the camera 106 that corresponds to the list of OICs that was transmitted to the acoustic device 112-1. The acoustic device 112-1 can record audio in response to receiving the list of OICs and turn off after an audible noise detected by acoustic device 112-1 drops below a threshold value.

In response to recording audio and turning off, the acoustic device 112-1 can perform a few functions. In some implementations, the acoustic device 112-1 can transmit the recorded audio to the audio aggregator 110 over network 108. The audio aggregator 110 can store the recorded audio and transmit the recorded audio to the central server 102 over the network 108. Moreover, the audio aggregator 110 can transmit the recorded audio received from each of the acoustic devices 112 to the central server 102 over the network 108 as microphone data 118.

The microphone data 118 can include audio snippets 119 from each acoustic devices 112 and include data identifying each snippet. The data identifying each audio snippet 119 can include an address identifying the microphone that recorded the audio snippet, a time the audio snippet 119 was recorded, and metadata describing the audio snippet 119. The metadata can include, for example, a range of audible frequencies of the corresponding audio snippet, radio frequency characteristics of the microphone, an identifier of the microphone that recorded the audio snippet, and other microphone characteristics. Additionally, the audio aggregator 110 can transmit a notification to the next subsequent acoustic device 112-2 to turn on and record audio.

In some implementations, central server 102 can receive the camera data 116 and microphone data 118 over network 108 and perform processes to estimate vehicle characteristics. As illustrated in system 100, the central server 102 can provide the camera data 116 and the microphone data 118 as input to the detection module 120. The detection module 120 can include one or more software components that can process the camera data 116 and the microphone data 118. Specifically, the detection module 120 can include the joint estimation space, which is useful for monitoring vehicles traversing the roadway 103 based on the camera data 116 and the microphone data 118 and estimating characteristics of those vehicles. Additionally, the detection module 120 can include a machine-learning module that can be trained to estimate and/or identify vehicle characteristics using acoustic information alone. Moreover, the detection module 120 can further refine and retrain a trained machine-learning model 122 to improve its accuracy.

In some implementations, the detection module 120 can include a virtual representation of the joint estimation space. The virtual representation of the joint estimation space can include a 3-D modeling representation of the roadway 103 monitored by the various cameras and acoustic sensors of system 100. The 3-D modeling representation can illustrate a 3-D rendering of the roadway 103, the vehicles 114 traversing the roadway, labels of the vehicles 114, audio snippets captured by the acoustic devices 112, and estimated vehicle characteristics of the vehicles 114. The 3-D rendering of the roadway 103 can be represented from the images and video captured by the cameras in system 100.

The vehicles 114 in the 3-D rendering can be represented by the identification of road actors from the images and videos captured by the cameras and subsequently processed by classifiers on the central server 102. The labels of the vehicles 114 can be representative of the OICs generated by the sensors that captured the image and videos in their field of view. The estimated vehicle characteristics can come from the trained machine-learning model and various estimations derived from the 3-D model. The detection module 120 can apply the estimated vehicle characteristics to the 3-D modeling representation to aid with monitoring the roadway 103.

Moreover, the detection module 120 can train a machine-learning model to produce estimates of vehicle characteristics. As discussed above, the detection module 120 can train the machine-learning model to produce estimated vehicle characteristics from the acoustic information, e.g., the microphone data 118, alone. The detection module 120 can train the machine-learning model by pairing (i) the camera data 116, (ii) the microphone data 118, and (iii) the label data that indicate some vehicle characteristic, and providing the data as input to the machine-learning model until the model is sufficiently trained.

For example, the detection module 120 performs a correlation to identify camera data 116 and microphone data 118 that includes similar time stamps. Similar time stamps may include values that have a difference by no more than 5 seconds, for example, or other differences. The detection module 120 performs a correlation to identify audio snippets 119 that were recorded at similar time stamps to one or more frames 117 of data. Moreover, the detection module 120 identifies audio snippets 119 that were recorded at similar locations to one or more frames 117 of data.

For example, the detection module 120 may perform a correlation to identify one or more frames 117 of data that were recorded by camera 106 and audio snippets 119 that were recorded by acoustic devices 112-1 through 112-4. However, the detection module 120 does not correlate any audio snippets captured by the acoustic device 112-N to the one or more frames 117 of data captured by camera 106 because they do not overlap in regions of coverage, e.g., recorded video by camera 106 does not overlap with audio coverage recorded by acoustic device 112-N. Similarly, the detection module 120 may correlate one or more frames 117 of data captured by camera 106 with audio snippets 119 recorded by acoustic devices 112-1 through 112-4 because of the overlapping regions of observance and the correlated data being within a designated time range.

By correlating audio and images from overlapping sensors, the detection module 120 can train a machine-learning model to identify vehicle characteristics from audio alone. For example, the one or more frames 117 of data can include one or more OICs that represent objects identified by the cameras in system 100. The audio snippets may correspond to noises produced by the objects, which are represented by the OICs. In this sense, the detection module 120 can continuously train the machine-learning module with the one or more frames 117 that include OICs for the detected objects with correlated audio snippets that correspond to the noises produced by the objects. The result of training enables the trained machine-learning model 122 to converge on a model that detects vehicle characteristics using acoustic data alone. The audio snippets can correspond to sounds these vehicles make when traversing the roadway and by pairing these sounds with OICs from the one or more frames 117 of data, the trained machine-learning model 122 can produce a likelihood of vehicle characteristics from the audio snippets.

In some implementations, the detected vehicle characteristics can include a variety of vehicle characteristics. For example, the trained machine-learning model 122 can produce a likelihood, such as a percentage, for each of at least one of a size of the vehicle, a volume of the vehicle, a color of the vehicle, and a class of the vehicle using acoustic data as input to the machine-learning model 122. Moreover, the trained machine-learning model 122 may be able to produce a likelihood for each of the velocity of the vehicle, an acceleration of the vehicle, a distance away from the vehicle, a number of axles that the vehicle has, a number of tires that vehicle has, and other information. For example, the trained machine-learning model 122 can receive an audio snippet and produce an indication that the sound indicates an 80% likelihood that vehicle represented in the audio snippet has 2 axles, 15% likelihood that the vehicle is red, 50% likelihood that that vehicle is over 120 $ft^3$ in size, 70% likelihood that the vehicle is a truck, and 90% likelihood that the vehicle is traveling over 30 miles per hour (MPH). The trained machine-learning model 122 can also produce other detected vehicle characteristics 124 as described above. For example, based on the determination of vehicle velocities and accelerations, the server can estimate a congestion of the roadway. The congestion can indicate an excess amount of vehicles on a roadway. Congestion can be characteristic of slower vehicle speeds, longer trip times for vehicles on a roadway, and increased vehicular queueing on a roadway.

In response to producing the detected vehicle characteristics 124, the detection module 120 can compare each of the likelihoods to threshold values. The threshold values can be used to ensure the accuracy of the trained machine-learning model 122. The thresholds for each of the data outputs from the trained machine-learning model 122 can be set by a designer of system 100 or learned over time. Specifically, the thresholds can be set individually, e.g., a threshold of 90% for the color, a threshold of 50% for the vehicle size, a threshold of 50% for the vehicle class, a 40% threshold for the vehicle speed and acceleration, and other threshold values for the respective outputs. Other values are also possible.

In response to comparing each output to their respective threshold value, the detection module 120 can generate an OIC from the output. For example, the OIC can be a string of "1100110011100111110," which represents the vehicle having 2 axles, e.g., "1100," the vehicle is over 120 $ft^3$ in size, e.g., "1100110," and the vehicle traveling over 30 MPH, e.g., "0111110." The central server 102 knows the locations of these bit string placements in the OIC and can store the locations of the bit string placements with the generated OIC for parsing purposes.

In some implementations, the detection module 120 can generate an OIC for each output that is generated from the detection module 120 and bit string places for each generated OIC. The OIC and the bit string placements can then be stored in the central server 102 for future retrieval. For example, the OIC and the bit string placements can be retrieved for retraining the trained machine-learning model 122 at a later point in time to improve its accuracy.

Additionally, the detection module 120 can use the generated OIC to update and revise the joint estimation space. For example, the trained machine-learning model 122 can produce an output OIC for a particular audio snippet and the detection module 120 can label the particular audio snippet in the joint estimation space as a vehicle with the representative OIC. In this manner, the central server 102 can continue tracking vehicles on roadway 103 using the audio snippets as well as the image data. In some implementations, a designer of the system can review the joint estimation space with the labels. The designer can review the joint estimation space from a client device or a display connected to the central server 102 to analyze the observations of modeling the roadway 103.

In some implementations, the detection module 120 enables the joint estimation space to determine or perceive characteristics about the vehicles in various situations. The detection module 120 can make determine characteristics about vehicles in real time or after the fact. Specifically, the detection module 120 can rely on acoustic information alone to estimate vehicle characteristics in a situation where, for example, the cameras have a difficult time viewing the roadway 103 due to rain, snow, sleet, or other inclement weather.

In another example, the detection module 120 can rely on acoustic information alone in areas unseen by the cameras, e.g., tunnels, underpasses, overpasses, or in parking garages, to name a few examples. Additionally, the detection module 120 can rely on acoustic information to enhance or augment the image information. For example, the detection module 120 may determine a vehicle, e.g., vehicle 114-N, is a truck based on the image information, and the acoustic information can indicate that the truck has 3 axles, e.g., by way of the trained machine-learning model 122 or noise profile comparisons. Similarly, the detection module 120 can train the machine-learning model 122 to estimate vehicle characteristics using acoustic data alone, especially in areas unseen by the imaging devices.

Similarly, in another example, the detection module 120 can determine that vehicle 114-4 is of a particular size, class, and traveling at a particular speed using the image information. The detection module 120 can use "overlapping" acoustic information, e.g., recorded acoustic information from a similar area where the image information was recorded, to confirm the size, class, and speed with which the vehicle 114-4 is traveling.

In another example, an optical image sensor that is located at a position of the roadway before the position of the acoustic device 112-N can provide observations to the acoustic device 112-N over network 108 indicating that an erratic driver is driving on roadway 103. In response to receiving the observations, the acoustic device 112-N can activate and record acoustic information of the erratic driver driving in a vehicle on the roadway 103. Both the optical image sensor and the acoustic device 112-N can transmit their respective sensor information to the central server 102. The central server 102 can analyze image data from the optical image sensor and the acoustic information from the acoustic device 112-N to estimate characteristics of the erratic vehicle. The central server 102 can provide these characteristics to the joint estimation space and the detection module 120 can analyze the joint estimation space in real time to monitor the erratic vehicle's behavior in relationship to other vehicles 114. In some examples, the detection module 120 can use the joint estimation space to monitor vehicles driving the wrong direction on roadway 103 and to monitor for any vehicular accidents.

FIG. 1B is another block diagram that illustrates an example of system 101 for monitoring vehicles traversing a roadway using acoustic and imaging devices. The system 101 includes similar components to system 100, which will not be described again here. The system 101 illustrates one or more induced deformities 126 embedded into the roadway 103. The system 101 enables one or more acoustic devices 112 to measure a sound that is created when a vehicle passes over the one or more induced deformities 126. Based on the type of sound created by the vehicle when driving over the induced deformities 126, the central server 102 can analyze the created sound to estimate characteristics of the vehicle that traversed over the one or more induced deformities 126.

As illustrated in system 101, vehicle 114-2 traverses over the one or more induced deformities 126 on roadway 103. A designer or implementer of system 101 can insert one or more induced deformities 126 at a specific location on the roadway 103. The one or more induced deformities 126 can include, for example, metal grates, speed bumps, wires, rumble strips, small wooden planks, a mound of asphalt, a mound of cement, a stone, or any other type of material. The one or more induced deformities 126 can be an artifact that includes man-made components or an artifact that is created from geological components.

In some implementations, when the designer or implementer of system 101 applies the one or more induced deformities onto the roadway 103, the one or more induced deformities 126 can be spaced apart by a predetermined distance. For example, as illustrated in system 101, four induced deformities 126 are spaced apart by a predetermined distance from one another. The predetermined distance can be, for example, 3 feet, 6 feet, 16 feet, or some other distance. There may be more or less than four induced deformities on the roadway—four deformities are shown for exemplary purposes.

In some implementations, the designer can determine a distance between each of the one or more induced deformities 126 based on characteristics of the roadway or based on an optimization algorithm. For example, the designer can set the distance between each deformity to be proportional to the prevailing speed of the roadway 103. The prevailing speed can be the speed limit set by implementers of roadway 103. The higher the prevailing speed, the greater the distance between the one or more induced deformities 126. The lower the prevailing speed, the smaller the distance between the one or more induced deformities 126.

In some implementations, the designer can set the spacing between each of the one or more induced deformities 126 based on an optimization algorithm. Although the spacing between each of the one or more induced deformities 126 may be based on prevailing speeds of the roadway 103, drivers may not follow the speed limit and may drive above and/or below the speed limit. In this manner, the designer can monitor how drivers use the roadway, analyze their corresponding speed in view of the prevailing speed of the roadway, and determine a spacing for the induced deformities 126 based on how drivers actually utilize the roadway 103. For example, if drivers typically drive 15 MPH over the speed limit of 45 MPH, then the designer can space the one or more induced deformities 126 by an amount for 60 MPH rather than the amount of 45 MPH.

In some implementations, the designer can set the spacing between each of the one or more induced deformities 126 based on various factors. First, the designer can select the spacing between each of the one or more induced deformities 126 based on the prevailing speed of the roadway 103. Second, the designer can select the spacing between each of the one or more induced deformities 126 to ensure that the microphones adjacent to the roadway 103 can hear distinct sounds of the vehicles' wheels traversing over the induced deformities 126. If the microphones are unable to distinguish between sounds from each set of wheels traversing over a deformity based on the speed of the vehicle, then the deformities need to be spaced at farther distances apart.

In some implementations, the designer of the system 101 can ensure the one or more induced deformities 126 cover a selected portion of the roadway 103. For example, as illustrated in system 101, the one or more induced deformities 126 can cover an entire lane of roadway 103, from one side of roadway 103 to a centerline. In another example, the one or more induced deformities 126 can cover both lanes of roadway 103, from one side of roadway 103 to the other side of roadway 103. In another example, the one or more induced deformities 126 can cover a small portion of one lane of roadway 103. The small portion can correspond to an area that is big enough that enables the tires of vehicle 114-2 to pass over, such as half the width of a lane on roadway 103. Other dimensions of the one or more induced deformities 126 are also possible.

In some implementations, the roadway 103 may have multiple sets of induced deformities. Specifically, the roadway 103 may have a set of induced deformities proximate to each microphone placed along the roadway 103. For example, the roadway 103 may have a set of induced deformities, e.g., induced deformities 126, proximate to microphone 112-3, a set of induced deformities proximate to the microphone 112-4, and so one through acoustic device 112-N. In some examples, each set of induced deformities may not be uniform and may change based on the type of roadway. In this manner, each microphone can record a sound produced by a vehicle traversing the roadway that travels over the one or more corresponding induced deformities.

When vehicle 114-2 drives over the one or more induced deformities 126 on roadway 103, the vehicle 114-2's tires striking the induced deformities 126 creates a sound that can be recorded by a microphone, e.g., microphone 112-3. Generally, when any vehicle drives over the induced deformities, the vehicle's path over the induced deformities 126 creates a sound that is recorded by a proximate microphone. Each vehicle's sound may be different, and the central server 102 can analyze this sound to produce characteristics of the vehicle traversed over the induced deformity.

Using a microphone to estimate characteristics of a vehicle can be beneficial in certain circumstances where a camera is not as helpful. For example, the central server 102 may desire to know the number of axles a vehicle has that traverses over the one or more induced deformities. A camera may not be able to determine how many axles a vehicle has because the axles are typically underneath the vehicle and hidden away from the camera, e.g., camera 106. Therefore, a benefit to using a microphone for estimating characteristics of a vehicle is (i) its minimal cost for implementation, (ii) its minimal memory footprint for recording audio, and (iii) its ability to measure mechanical actuations of the vehicle that cannot typically be viewed by an external camera.

As illustrated in system 101, vehicle 114-2 traverses over the one or more induced deformities 126 and a sound 128 is produced from the action. The sound 128 can be described based on its loudness, signal-to-noise ratio (SNR), pitch, intensity, and frequency. The loudness of the sound 128 can vary with frequency and can be measured by a particular microphone.

The SNR can represent an amount of signal identified in the sound 128 in comparison to the noise identified in the sound 128. The pitch of the sound 128 can be a sensation of a frequency and may be either low, medium, or high, to name a few examples. The intensity of the sound 128 can be an amplitude of the sound 128 based on changes in pressure. The amplitude of the sound 128 is louder if the amplitude increases, and softer if the amplitude decreases. The frequency of the sound 128 can be represented based on a wavelength of the sound 128, and can dictate the pitch of the sound 128. The higher the frequency of the sound 128 results in a higher pitch. The lower the frequency of the sound 128 results in a lower pitch.

In some implementations, the microphone 112-3 can record the sound 128 of the vehicle 114-2 traversing over the one or more induced deformities. The microphone 112-3 can provide the recorded sound 128 to the audio aggregator 110. The audio aggregator 110 can generate a data package 130 that includes the recorded sound 128 and metadata that describes the recorded sound 128. The metadata can include, for example, a range of audible frequencies of the corresponding audio snippet, radio frequency characteristics of the microphone, an identifier of the microphone that recorded the audio snippet, and other microphone characteristics.

The data package 130 may also include the sound recorded from microphones 112-4 and 112-N, although the sound recorded from these microphones may have a smaller amplitude due to their distance from the one or more induced deformities. In some implementations, the data package 130 may include a sound recorded from microphones 112-4 and 112-N based on vehicle 114-2 driving over the deformities proximate to the microphones 112-4 and 112-N. In this case, the data package 130 may include the sound 128 from microphone 112-3, a sound from microphone 112-4, and a sound of acoustic device 112-N. Each of these sounds in the data package 130 may represent the sound of vehicle 114-2 traversing over one or more induced deformities proximate to each of the microphones.

The audio aggregator 110 can transmit the data package 130 to the central server 102 over network 108. In some implementations, each of the microphones can transmit their recorded sounds to the central server 102 and bypass the audio aggregator 110. In this case, each of the microphones transmitting their recorded sounds to the central server 102 can include metadata identifying the microphone and characteristics describing the recorded sound.

In some implementations, the central server 102 can receive the data package 130 from the audio aggregator 110. The central server 102 can extract the sound 128 from the data package and determine from the metadata characteristics about the sound 128. For example, the central server 102 can determine the sound 128 was recorded by microphone 112-3 at a time of Jan. 1, 2022 at 4:00 PM ET. Then, the central server 102 can provide the data indicative of the sound 128 to the detection module 120 to analyze the sound and determine characteristics related to the vehicle observed in the sound 128. The data indicative of the sound 128 can include a location in memory of the sound 128, a location in an external database of the sound 128, or the data components of the sound 128 itself, to name a few examples.

In response to receiving the sound 128, the detection module 120 can analyze the sound 128 to determine characteristics related to the vehicle observed in the sound 128. As described with respect to system 100, the detection module 120 can provide the sound 128 as input to the trained machine-learning model 122 to produce various likelihoods of the vehicle identified in the sound 128. For example, the likelihoods can include a number of axles in the vehicle based on a rate of mechanical actuations of the tires striking the deformities, a color of the vehicle, a size of the vehicle, a class of the vehicle, a speed of the vehicle, an acceleration of the vehicle, and other vehicle characteristics. In response, the detection module 120 can compare each likelihood to their respective threshold value to aid in estimating the vehicle characteristic with greater accuracy.

In some implementations, the detection module 120 can analyze the sound 128 to determine the number of axles in the vehicle. For example, the detection module 120 can count the number of axles on a vehicle based on the number of vibrations induced when the vehicle 114-2 traverses over the one or more induced deformities 126. Specifically, a microphone, such as microphone 112-3, records a sound created each time a wheel of the vehicle 114-2 passes over a deformity. This sound can represent a particular axle of the vehicle. Thus, if the vehicle 114-2 drives over a deformity of the induced deformities 126, the microphone 112-3 can measure two sounds, one sound for the front axle, and one sound for the rear axle. The detection module 120 can then measure these two sounds from microphone 112-3 to determine that the vehicle 114-2 that traversed over the one or more deformities includes 2 axles. Other examples are possible for vehicles with a different number of axles.

In some implementations, the detection module 120 can determine the speed of the vehicle traversing over the induced deformities 126 based on subsequent sounds and a time between each sound. For example, when a vehicle traverses over the induced deformities 126, a first sound is made when the tires of the front axle passes over a deformity and a second sound is made when the tires of the rear axle passes over the deformity. The detection module 120 can measure the time between the two sounds and a distance between the two sounds, e.g., based on determining Euclidean distance between two sound waves and the time between the two sounds. Using the time and the distance between the two sounds, the detection module 120 can measure the velocity of the vehicle that corresponds to the sounds.

In some implementations, the detection module 120 can analyze the sound 128 to determine characteristics related to the vehicle observed in the sound 128 without using the trained machine-learning model. For example, the detection module 120 can compare the sound 128 to one or more stored sounds or noise profiles previously recorded and labeled. The one or more stored noise profiles 132-1 through 132-N can include various sound snippets related to specific vehicles driving over one or more induced deformities 126. For example, the stored noise profile 132-1 can represent the sound a 4-wheeled two-axle car driving over the one or more induced deformities 126. The stored noise profile 132-2 can represent the sound of a motorcycle driving over the one or more induced deformities 126. The stored noise profile 132-N can represent the sound of a 3-axle truck driving over the one or more induced deformities 126.

The central server 102 may include other stored noise profiles, and more characterizations for each stored noise profile. For example, the additional characterizations can include one or more of a size or volume of the vehicle, e.g., 130 ft$^3$, a speed of the vehicle, a color of the vehicle, a location of the vehicle, an acceleration of the vehicle, and a class of the vehicle. In this manner, the detection module 120 can compare the received sound 128 to various stored sounds to identify a likelihood that the vehicle identified in the received sound 128 corresponds to at least one of the stored sounds. For example, the detection module 120 can compare characteristics of the received sound 128, e.g., intensity, frequency, phase, and pitch, to characteristics for each of the stored noise profiles 132-1 through 132-N. In response to comparing, the detection module 120 can produce a percentage that indicates a similarity score between the received sound 128 and each of the stored noise profiles 132-1 through 132-N.

Then, the detection module 120 can produce estimations of the vehicle in the received sound 128 using the characterizations of the vehicle identified in the compared sound with the greatest similarity score. For example, the detection module 120 can determine that the stored noise profiles 132-1 matches to the received sound 128 with a similarity score of 98%; the stored noise profiles 132-2 matches to the received sound 128 with a similarity score of 60%; and, the stored noise profile 132-N matches to the received sound 128 with a similarity score of 245. In response, the detection module 120 can select the characteristics associated with the stored noise profile 132-1. The detection module 120 can apply the characteristics associated with the stored noise profile 132-1 to the recorded sound 128, i.e., indicating that the vehicle in the recorded audio 128 has 4 wheels and has two axles, for example. Other examples are also possible.

In some implementations, the results of the comparison between the received audio and the stored audio can be used to train and retrain the trained machine-learning model 122. For example, the results of the comparison between the received sound 128 and the comparison to the stored noise profiles 132-1 through 132-N can indicate characteristics 134 that can represent the vehicle identified in the sound 128. The detection module 120 can also provide the sound 128 as input to the trained machine-learning model 122. The central server 102 can train the machine-learning model 122 using the identified stored audio and other imaging data to estimate characteristics of vehicles on the roadway 103.

In response to receiving an output from the trained machine-learning model 122, the detection module 120 can compare the output to the characteristics 134. If the comparison between the characteristics 134 and the likelihoods from the output of the trained machine-learning model 122 are similar, then the detection module 120 can determine that the trained machine-learning model 122 is performing as expected. However, if the trained machine-learning model 122's results are different from the characteristics 134, then the detection module 120 can decide whether to (i) retrain the trained machine-learning model or (ii) revise the comparison method.

The detection module 120 can determine whether to retrain the trained machine-learning model based on the similarity score determined between the received sound 128 and the stored sound. If the similarity score is greater than a threshold value, e.g., 90%, then the detection module 120 can determine that the trained machine-learning model 122 needs to be retrained and refined because the received sound 128 and the stored sound that was closely identified to the received sound 128 are near identical. As such, the error can exist with the trained machine-learning model 122.

However, if the similarity score is below than or equal to the threshold value, then the detection module 120 can determine that the results of the comparison between the received sound 128 and the stored sound are more than likely incorrect. As such, the detection module 120 can discard the stored sound and re-compute the similarity scores for the comparison between the received sound 128 and the stored sounds to identify a likely match. This process can repeat until either the trained machine-learning model or the comparison process to stored sounds results in a likely match that is greater than a threshold value.

In some implementations, each of the one or more induced deformities 126 may include additional sensors that aid in estimating characteristics of the vehicles that traverse the roadway. Specifically, the one or more induced deformities 126 can include weight sensors that can be useful when seeking to determine a size or volume of the vehicle. The weight information can be provided in the data package 130 to the central server 102 and helpful in identifying various characteristics related to the shape, size, and volume of the traversing vehicle.

In this manner, the detection module 120 can identify characteristics of vehicles that traverse over the one or more induced deformities 126 without the use of cameras. The characteristics can then be used to update the joint observation space of system 100, monitor movements of vehicles on the roadway 103, and even further refine the trained machine-learning model 122. The detection module 120 can also store the received sound 128 with the identified characteristics 134 and use this for comparisons of future recorded sounds received from the microphones.

Figure 1C:
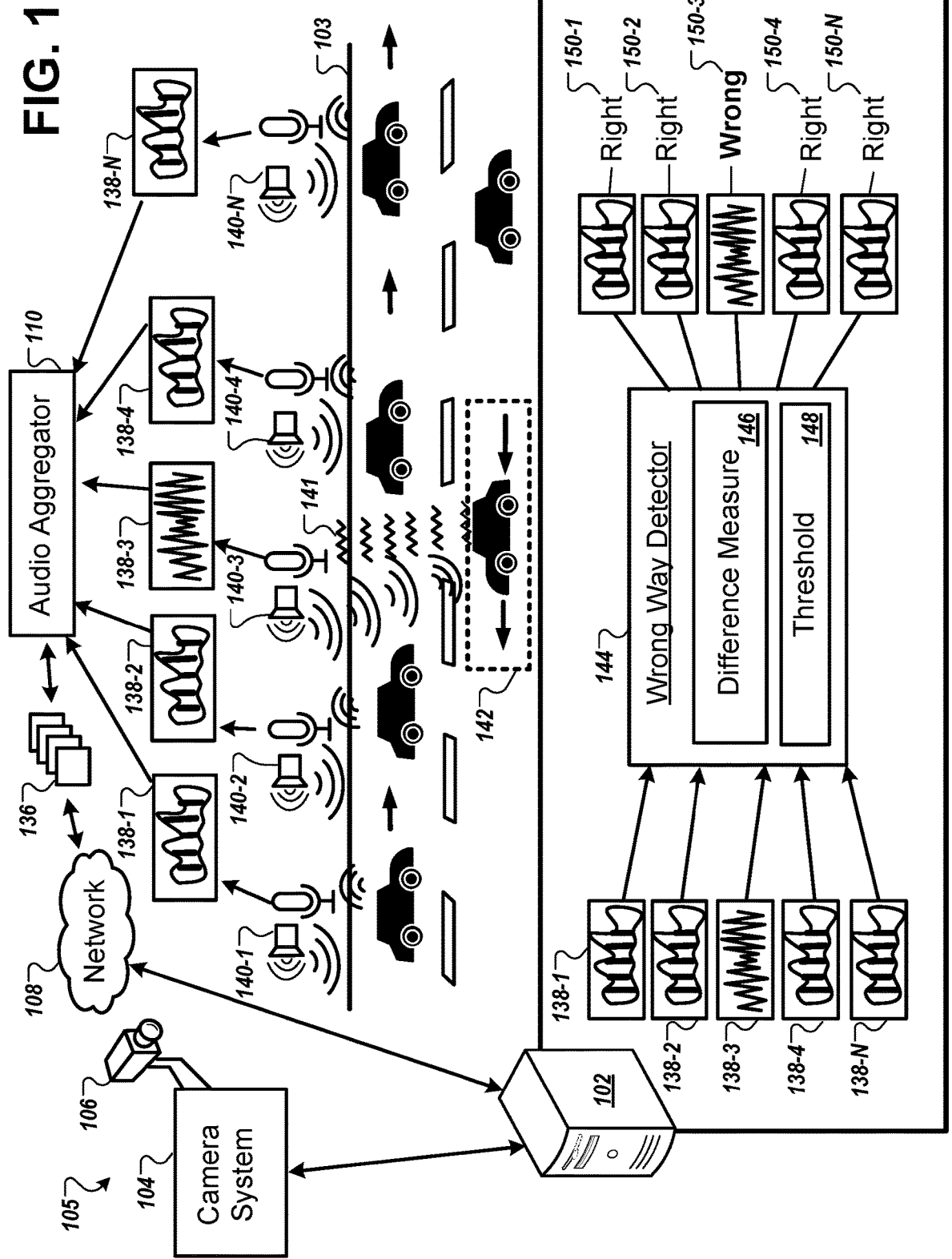

FIG. 1C is another block diagram that illustrates an example system 105 for monitoring vehicles traversing a roadway using acoustic and imaging devices. The system 105 includes similar components to systems 100 and 101, which will not be described again here. The system 105 illustrates a wrong way detector that is useful detecting a vehicle traveling in a wrong direction on roadway 103.

Specifically, the system 105 includes one or more speakers that can broadcast directional noise to the vehicles on the roadway 103. The microphones of system 105, similar to acoustic devices 112 of systems 100 and 101, can obtain the received sound wave that reverberated off the vehicles traversing the roadway 103. The microphones can transmit their recorded sound wave to the central server 102. In response, the central server 102 can assess the directionality of the received sound wave proportional to the directionality of the white noise blanket saturated by the speakers to determine whether one or more vehicles are traveling in the wrong direction.

As illustrated in system 105, one or more speakers 140-1 through 140-N (collectively "speakers 140") are positioned adjacent to the roadway 103. Specifically, the one or more speakers 140-1 through 140-N may spaced apart along the roadway 103 by a predetermined distance. In some implementations, the speakers 140 can be configured to transmit or broadcast noise. Specifically, the speakers 140 can broadcast white noise with a particular amplitude, directionality, frequency, and other characteristics.

In one example, the speakers 140 can be configured to broadcast white noise in response to receiving instructions, e.g., a list with OICs, from a camera indicating a detected object in its field of view. In another example, the speakers 140 can continuously broadcast white noise without receiving instruction from another sensor device. In another example, a designer of system 100 can instruct the speakers 140 to broadcast white noise in response by transmitting a notification to the speakers 140 over network 108 from central server 102.

In some implementations, the system 105 can use the speakers 140 and microphones to detect and monitor wrong way driving by one or more vehicles traversing the roadway 103. Specifically, the speakers 140 can transmit a blanket of white noise for a period of time. The white noise can be transmitted at a specific frequency, amplitude, and directionality. The central server 102 can select the characteristics for the speakers 140 to transmit the white noise to ensure no vehicles electronic systems are affected or disturbed by the white noise. For examples, cars typically resonate between 30 to 80 Hz. As such, the speakers 140 can transmit white noise at a frequency outside of the resonating frequency of vehicles to reduce the sound generated in the system 105.

For example, the speakers 140 can transmit a pressure wave that includes a frequency of anywhere between 20 to 20,000 Hz with an amplitude of 10 decibels (dBs) and in a direction towards the roadway 103. As mentioned above, the speakers 140 may transmit a pressure wave outside the frequency of the resonating frequency of vehicles. In some examples, the central server 102 can select the amplitude in dBs for the white noise to be transmitted based on a proportionality to the distance between each speaker and a prevailing speed of the roadway 103. For example, the server 102 can select a greater amplitude in dBs for the white noise when the distance between each speaker is higher and a prevailing speed of the roadway 103 is higher. Similarly, the server 102 can select a lower amplitude in dBs for the white noise when the distance between each speaker is lower and a prevailing speed of the roadway 103 is lower. Other examples for selecting the amplitude in dBs for the white noise are also possible. The speakers 140 can transmit the white noise towards the vehicles traversing the roadway 103 to identify one or more vehicles traversing in the wrong directions. In some examples, the speakers 140 can broadcast other types of sounds instead of or in addition to white noise. The other types of sounds can include, for example, music, Gaussian noise, and sirens, to name a few examples.

In response to transmitting the white noise, the white noise reverberates off vehicles or objects traveling along the roadway 103 in a particular direction. The white noise reverberation off the vehicles is counter incident to or opposite to the white noise that was transmitted by the speakers 140. One or more microphones can capture the reverberated white noise and can transmit the reverberated white noise to the central server 102 for further analysis and processing.

For example, as illustrated in system 105, speakers 140-1 through 140-N transmit white noise across the roadway 103 to detect vehicles traveling in the wrong direction. The roadway 103 illustrates vehicles traveling in the correct direction from west to east. However, a vehicle 142 is traveling in the wrong direction on roadway 103. The system 105 can detect this vehicle traveling in the wrong direction and any other vehicles traveling the wrong direction.

In some implementations, the microphones of system 105 can obtain a recorded reverberation wave of noise in response to the speakers 140 transmitting the white noise. For example, the recorded reverberation waves of noise can include received waves 138-1, 138-2, 138-3, 138-4, and 138-N (collectively "waves 138"). The recorded reverberation waves of noise can include acoustic adjustments to the transmitted wave. For example, the acoustic adjustments can include amplitude changes, phase changes, and frequency changes when compared to the transmitted wave. The acoustic adjustments can be caused by the collision of the transmitted wave with cars driving the correct direction, one or more cars driving the incorrect direction, stopped cars, poles, traffic lights, the ground, a bridge, a tunnel, and other components. Each of the microphones that recorded the waves 138 can transmit the recorded waves 138 to the audio aggregator 110 over the network 108.

The audio aggregator 110 can add metadata to each of the recorded waves and combine data representing each of the recorded waves to a data package 136. Additionally, the audio aggregator 110 can include data representing the white noise that was transmitted by each of the speakers 140 in the data package 136. The data representing the blanket noise can include, for example, a frequency of the noise, an amplitude of the noise, a phase of the noise, and a directionality of the noise. Then, the audio aggregator 110 can transmit the data package 136 to the central server 102 over the network 108.

In some implementations, the central server 102 can receive the data package 136 and extract the waves 138 from the data package 136. Moreover, the central server 102 can extract the characteristics that describe the white noise that was transmitted by the speakers 140. The central server 102 can provide the characteristics that describe the transmitted white noise to the wrong way detector 144 for comparing to the received waves 138.

In some implementations, the central server 102 can include a wrong way detector 144 that can include one or more software modules that can detect whether a vehicle is driving in a wrong direction. Specifically, the wrong way detector 144 includes a difference measure 146 and a threshold function 148. The difference measure 146 can be used to measure the difference between the transmitted white noise wave and each of the received waves 138. The threshold function 148 can be used to determine whether the difference between the waves measured in 146 exceeds a threshold value.

In some implementations, the wrong way detector 144 can generate the noise wave that was transmitted by the speakers 140 using the characteristics that describe the transmitted noise. For example, the wrong way detector 144 can generate the noise wave using a white noise generator, a software function that generates white noise, or some other function. In response to generating the white noise, the difference measure 146 can compare the generated noise wave that represents the transmitted noise wave to each of the received waves 138.

For example, the difference measure 146 can compare the two waves or two signals in the time domain or in the frequency domain and can perform a variety of functions to measure their difference. Specifically, the difference measure 146 can perform a correlation between the two signals, measure a phase difference between the two signals, measure a frequency difference between the two signals, measure an amplitude difference, measure how the signals' characteristics change over time with respect to one another, e.g., the frequency/amplitude/phase of each signal can change with respect to time and this can be measured between the two signals, measure both waves' resulting Doppler effect, or any of the above. In another example, the difference measure 146 can apply a matched filter to the received signal. Specifically, the difference measure 146 can apply a matched filter that includes a reverse copy of the transmitted signal, e.g., an amplitude, phase, or frequency flip, and seeks to identify a similar signal. The similar signal can be indicative of a vehicle that is driving in the wrong direction. In some examples, the matched filter can include other and/or different characteristics when searching for a signal that represents a vehicle driving in the reverse direction. In response to determining the difference or similarity between each wave, the wrong way detector 144 can determine one or more characteristics about the two waves.

Specifically, the wrong way detector 144 can assess the resultant vector of the received waves, which subsequently can be used to analyze characteristics of the vehicles. For example, the wrong way detector 144 can determine an angle of incidence for each of the received waves 138 measured by a microphone, which can correspond to a direction the vehicle is traveling. Additionally, the wrong way detector 144 can determine a velocity associated with each of the received waves, which can correspond to a velocity of a vehicle.

The wrong way detector 144 can use the differences measured by the difference measure 146 to determine how the two waves compare, and in particular, how each received wave indicates whether a vehicle is driving in the opposite direction. For example, the wrong way detector 144 can determine that if the transmitted wave and the received wave are out of phase by 180 degrees, then the wrong way detector 144 may be able to indicate that a vehicle is traveling the wrong direction. Alternatively, if the transmitted wave and the received wave are in phase, then the wrong way detector 144 can indicate that a vehicle is traveling in the correct direction.

In some implementations, the wrong way detector 144 can compare the differences measured by the difference measure 146 to values in the threshold function 148. For example, the wrong way detector 144 can compare phase differences, frequency differences, amplitude differences, correlation values, and other wave differences to various threshold values. If the wrong way detector 144 determines that the differences from at least one of the difference measurements meets or exceeds a threshold value, then the wrong way detector 144 can deem a wrong way driver has been identified. For example, a threshold value of 180 degrees is set for detecting a phase difference between a transmitted noise wave and the received noise wave. If the phase difference is greater than or equal to 180 degrees, then the wrong way detector 144 can indicate a vehicle is driving in the wrong direction. Alternatively, if the phase difference is less than 180 degrees, then the wrong way detector 144 can indicate a vehicle is driving in the correct direction.

In some implementations, the wrong way detector 144 can determine outputs for each of the received signals based on their comparison to the transmitted noise. For example, the wrong way detector 144 can provide the following: a notification 150-1 indicating received wave 138-1 represents a vehicle traveling in the correct direction; a notification 150-2 indicating the received wave 138-2 represents a vehicle traveling in the correct direction; a notification 150-3 indicating the received wave 138-3 represents a vehicle traveling in the wrong direction; a notification 150-4 indicating the received wave 138-4 represents a vehicle traveling in the correct direction; and, a notification 150-N indicating the received wave 138-N represents a vehicle traveling in the correct direction.

In some implementations, the wrong way detector 144 can rely on Doppler measurements to determine whether one or more vehicles are traveling in the wrong or correct direction on the roadway 103. The wrong way detector 144 can measure waves received by a microphone over a period of time. For example, a particular speaker, e.g., speaker 140-2, may transmit a noise wave over a period of ten minutes and a microphone can obtain the resultant or reflected noise wave.

The microphone or the audio aggregator 110 may transmit the information to the central server 102 for processing. The wrong way detector 144 can determine from the received information that during the period of ten minutes, the reflected noise waves increased in frequency and were received at an incidence angle of 20 degrees then decreased in frequency and were received at an incidence angle of 110 degrees. This pattern of increasing frequency and being received at a first incidence angle of 20 degrees to a decreasing frequency and being received at a second incidence angle of 110 degrees indicates vehicles traveling regularly during this 10 minute period from west to east, e.g., left to right on the roadway 103. This means the vehicles were traveling in the correct direction based on the observed Doppler measurements. In Doppler, an increase in frequency of a received wave indicates a movement of an object towards the source, and a decrease in frequency of a received wave indicates a movement of an object away from the source.

However, during this same ten-minute period, the wrong way detector 144 can determine the received wave increases in frequency and were received at an incidence angle of 110 degrees then decreased in frequency and were received at an incidence angle of 20 degrees. This wrong way detector 144 can determine that this pattern of wave frequencies indicates one or more vehicles traveling from east to west, e.g., right to left on the roadway 103. The wrong way detector 144 can flag that this particular received wave or a set of waves indicates that a vehicle is driving in the wrong direction on the roadway 103 because the frequencies of the received waves changed direction.

As illustrated in system 105, this wrong way driver is illustrated by vehicle 142, driving the wrong direction on roadway 103. Additionally, the wrong way detector 144 can measure the received wave 141 over time that reverberated off the vehicle 142 to determine how the vehicle 142 moves along the roadway 103. In this sense, the wrong way detector 144 can detect wrong way driving movement of vehicle 142 using Doppler measurements and other wave measurements.

In some implementations, the central server 102 can notify authorities based on any detected vehicle traveling the wrong direction. For example, in response to determining the notification 150-3 indicates a vehicle is traveling on the roadway 103 in the wrong direction, the central server 102 can notify the police authorities, emergency medical services (EMS) response, and other security services of such driving behavior. In some examples, the central server 102 can transmit a warning to the speakers 140 to play a siren or a loud message to safe drivers that a vehicle is driving in the wrong direction on the roadway. Other warning notifications are also possible.

Figure 2:
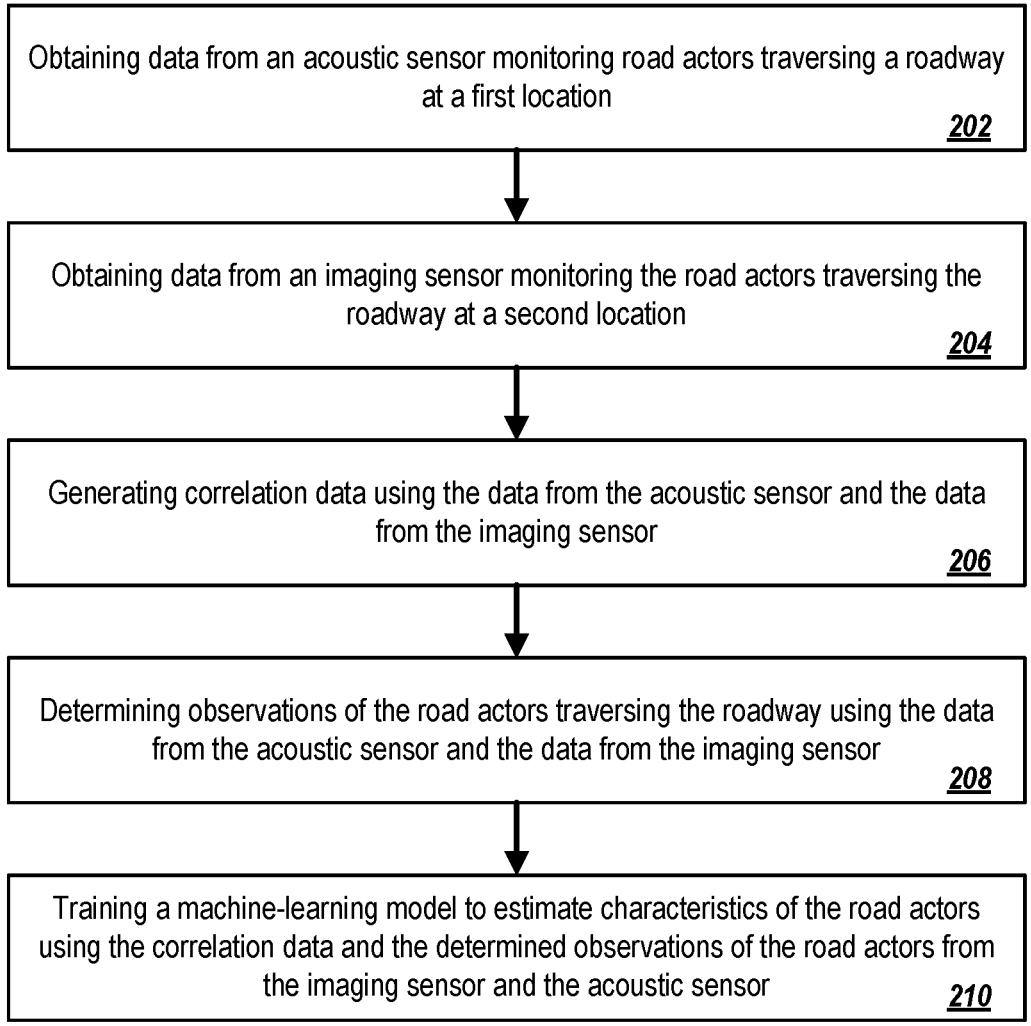
FIG. 2 is a flow diagram that illustrates an example of a process for training a machine-learning model to estimate vehicle characteristics of vehicles traversing a roadway.

FIG. 2 is a flow diagram that illustrates an example of a process 200 for training a machining-learning model to estimate vehicle characteristics of vehicles traversing a roadway. The server 102 can perform the process 200.

In the process 200, the server can obtain data from an acoustic sensor monitoring road actors traversing a roadway at a first location (202). Moreover, the server can obtain sensor data from multiple acoustic devices at different points in time. An acoustic device can include, for example, a microphone and a speaker. The multiple acoustic devices can be placed alongside a roadway, at predetermined distances apart. These acoustic devices can monitor a portion of the roadway based on their respective noise profile that allows for a specific field of view. In some examples, an acoustic device, such as a microphone, can include an audible decibel range between the hearing frequencies of 20-20,000 Hz, to name one example. Other audible decibel ranges are also possible.

Each acoustic device on the roadway can record audio data and provide the audio data to an audio aggregator. The audio aggregator can obtain audio data from each acoustic device and even can provide audio data from one acoustic device to another acoustic device. Similarly, the audio aggregator can broadcast information from one acoustic device to different acoustic devices. The broadcasting can be used to instruct the different acoustic devices to initiate recording audio. Additionally, the audio aggregator can transmit the recorded acoustic device from each of the acoustic devices to a central server.

The server can obtain data from an imaging sensor monitoring the road actors traversing the roadway at a second location (204). Specifically, the imaging sensor can include sensors different from the acoustic sensors. For example, the imaging sensor can include a LIDAR sensor, a video camera, an infrared sensor, and a radar sensor. The system can also include other sensors such as, a Bluetooth system, a Wi-Fi system, and other devices. The imaging sensor may also include a combination of devices, e.g., an infrared sensor, a Bluetooth system, and a Wi-Fi system.

Each of the imaging sensors can communicate with a camera system. The camera system can be a separate component that provides imaging and other sensor data to the central server. Specifically, the camera system can receive footage from each of the imaging sensors and transmit the footage to the central server for further processing. The camera system can broadcast camera information to different cameras, which may include instructing different cameras to record based on recorded footage from a single camera.

The server can generate correlation data using the data from the acoustic sensor and the data from the imaging sensor (206). In response to the server receiving camera data and audio data from the camera system and audio aggregator, respectively, the server can perform processes to estimate vehicle characteristics of vehicles on the roadway.

Specifically, the central server can provide the received camera data and the received audio data as input to a detection module. The detection module can include one or more software components that aid with estimating vehicle characteristics of vehicles.

Specifically, the detection module can include a joint estimating space. The joint estimation space can include a 3-D modeling representation of the monitored by the acoustic devices and the cameras using the acoustic data and the camera footage, respectively. The 3-D modeling can include a 3-D rendering of the roadway, one or more vehicles traversing the roadway, a labeling of the vehicles, audio snippets captured by the acoustic devices, and estimated vehicle characteristics, as will be further outlined below. The detection module can generate this joint estimation space (i) using the acoustic data from acoustic devices, (ii) using the camera footage from the imaging devices, and (iii) observations of the vehicles traversing the roadway.

The joint estimation space can represent the roadway at different locations. The locations based on the locations of the audio devices and the imaging devices. The detection module can use the joint estimation space to determine characteristics of the vehicles at various locations on the roadway. To do so, the detection module can perform a correlation between camera data and microphone data. Specifically, the detection module performs a correlation to identify audio data or audio snippets that were recorded at similar time stamps to one or more frames of imaging data. For example, the detection module can correlate audio data to imaging data based on their locations and fields of view.

Generally, the detection module can perform a correlation between imaging data captured by a camera that has a field of view which overlaps regions of noise profiles found in acoustic data from the acoustic devices. The overlapping fields of view enables the detection module to associate audio data in the same region as imaging data, e.g., recorded audio from a roadway region that is recorded in the imaging data. For example, a first camera may cover a region of the roadway that is also covered by a first microphone and a second microphone. Thus, the detection module can perform a correlation between imaging data captured by the first camera and audio data captured by the first and second microphones.

The server can determine observations of the road actors traversing the roadway using the data from the acoustic sensor and the data from the imaging sensor (208). Specifically, when the server receives imaging data, the imaging data can include an OIC generated by the imaging devices, which uniquely identifies an object, such as a vehicle, in the imaging data. The OIC may be a unique representation, e.g., hexadecimal value or a string, which describes the observable properties of the object.

In some cases, each frame of imaging data can include an OIC for each vehicle, when multiple vehicles are shown. The observable features represented by the OIC can include the object color, the object size, the object class, a location of the object, and the volume of the object. Additionally, the server can use the acoustic data to match to stored acoustic data. Specifically, the server can store sound or noise profiles that represent specific vehicles. For example, the server can store sound profiles of a 4-wheeled two-axle car driving, a motorcycle driving, a 3-axel track, and other vehicle types. The server can compare the received acoustic data from the acoustic devices to each sound profile of the stored sound profiles to identify a likelihood that the vehicle identified in the received sound corresponds to at least one of the stored sounds. For example, the server can determine that one stored sound profile matches to the received acoustic data with a similarity score of 98% and another stored sound profile to the received acoustic data with a similarity score of 50%. Then, the server can identify the vehicle in the received acoustic data as the vehicle represented to the stored sound profile that matches with the similarity score of 98%.

The server can train a machine-learning model to estimate characteristics of the road actors using the correlation data and the determined observations of the road actors from the imaging sensor and the acoustic sensor (210). For example, the central server can train the machine-learning model to produce estimated vehicles characteristics from the acoustic information alone. The training can be performed by (i) pairing together imaging data, audio data identified from the audio comparison and other noise profiles, and label data that indicates some vehicle characteristic and (ii) providing the data as input to a machine-learning model.

The trained machine-learning model can also be used to augment the joint estimation space. For example, the trained machine-learning model can output a likelihood or percentage for each of at least one of a size of the vehicle, a volume of the vehicle, a color of the vehicle, and a class of the vehicle. The input to the trained machine-learning model can be acoustic data from the acoustic devices, imaging data from the imaging devices, or both data types. In response, the trained machine-learning model can produce a likelihood for each of the velocity of the vehicle, an acceleration of the vehicle, a distance away from the vehicle, a number of axles that the vehicle has, a number of tires that vehicle has, and other information. The trained machine-learning model can also be trained to produce an OIC for a particular input.

Then, the central server can label the data shown in the joint estimation space with the outputs from the trained machine-learning model, e.g., vehicle characteristics and OICs. In this manner, the joint estimation space can be used to provide vehicle characteristics in areas where the cameras' field of view does not cover but where the microphones' field of view covers. Similarly, the joint estimation space can be used to provide vehicle characteristics in areas where the microphones' field of view does not cover but where the cameras' field of view covers. Also, the joint estimation space can be used to provide vehicle characteristics in areas where the microphones' field of view does cover and where the cameras' field of view covers. Additionally, in areas not covered by the microphones or cameras, the server can use the trained machine-learning model to estimate characteristics of vehicles on the roadway unseen by different sensors.

In some examples, the central server can determine the speed of a vehicle based on subsequent acoustic information. For example, the central server can receive first acoustic data from a first microphone at a first time and receive second acoustic data from a second microphone at a second time. The server can determine that the first acoustic data and the second acoustic data include similar noise profiles. In response, the server can determine a type of the vehicle identified in the first and second acoustic data. Then, the server can determine a velocity of the vehicle based on (i) a distance between the first microphone and the second microphone and (ii) a time difference between the first time and the second time. The server can use this velocity estimation to compare with the velocity estimation produced by the trained machine-learning model, and can aid in retraining the trained machine-learning model should the velocities differ by a significant amount.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining, by one or more processors, data from an acoustic sensor monitoring road actors traversing a roadway at a first location;
   obtaining, by the one or more processors, data from an imaging sensor monitoring the road actors traversing the roadway at a second location;
   generating, by the one or more processors, correlation data using the data from the acoustic sensor and the data from the imaging sensor;
   determining, by the one or more processors, observations of the road actors traversing the roadway using the data from the acoustic sensor and the data from the imaging sensor; and
   training, by the one or more processors, a machine-learning model to estimate characteristics of the road actors using the correlation data and the determined observations of the road actors from the imaging sensor and the acoustic sensor,
   wherein generating the correlation data using the data from the acoustic sensor and the data from the imager sensor further comprises:
   generating, by the one or more processors, joint correlation data for modeling an environment of the road actors traversing the roadway using (i) the data from the acoustic sensor at the first location, (ii) the data from the imaging sensor at the second location, and (iii) the observations of the road actors traversing the roadway, the joint correlation data indicating (i) first characteristics of the road actors at the first location not in a field of view of the imaging sensor, (ii) second characteristics of the road actors at the second location not in a field of view of the acoustic sensor, and (iii) third characteristics of the road actors at a third location in a field of view of both the acoustic sensor and the imaging sensor.

2. The computer-implemented method of claim 1, wherein the first location is different from the second location.

3. The computer-implemented method of claim 1, wherein the first location is similar to the second location.

4. The computer-implemented method of claim 1, wherein obtaining data from the acoustic sensor monitoring the road actors further comprises:
   receiving, by the one or more processors, first acoustic data from a first acoustic sensor at a first time; and
   receiving, by the one or more processors, second acoustic data from a second acoustic sensor at a second time.

5. The computer-implemented method of claim 4, wherein a difference between the first time and the second time represents (i) a distance between the first acoustic sensor and the second acoustic sensor on the roadway and (ii) a speed at which the road actor moves on the roadway between the first acoustic sensor and the second acoustic sensor.

6. The computer-implemented method of claim 4, wherein the first acoustic data represents a sound profile of the road actor at the first time and the second acoustic data represents the sound profile of the road actor at the second time.

7. The computer-implemented method of claim 1, wherein the imaging sensor comprises at least one of a LIDAR system, a RADAR system, and a camera.

8. The computer-implemented method of claim 1, wherein determining the observations of the road actors using the data from the imaging sensor and the acoustic sensor further comprises:
   determining, by the one or more processors, a sound profile for each of the road actors traversing the roadway;
   determining, by the one or more processors, a location for each of the road actors in the data from the imaging sensor;
   determining, by the one or more processors, a color for each of the road actors in the data from the imaging sensor; and
   determining, by the one or more processors, a size for each of the road actors in the data from the imaging sensor.

9. The computer-implemented method of claim 1, wherein training the machine-learning model to estimate the characteristics of the road actors using the correlation data and the determined characteristics of the road actors from the imaging sensor and the acoustic sensor further comprises:
   training, by the one or more processors, the machine-learning model to estimate characteristics of the road actors in a location where the imaging sensor cannot view the roadway.

10. The computer-implemented method of claim 1, further comprising:
    estimating, by the one or more processors, the characteristics of the road actors on the roadway by providing data from the acoustic sensor to the trained machine-learning model.

11. The computer-implemented method of claim 1, wherein the characteristics of the road actors comprise at least one of a number of axles in a road actor, a speed of the road actor, an acceleration of the road actor, a congestion of the roadway, and a number of road actors at the first location and the second location.

12. A system comprising:
one or more computers and one or more storage devices storing instructions that are operable, when executed by the one or more computers, to cause the one or more computers to perform operations comprising:
obtaining, by one or more processors, data from an acoustic sensor monitoring road actors traversing a roadway at a first location;
obtaining, by the one or more processors, data from an imaging sensor monitoring the road actors traversing the roadway at a second location;
generating, by the one or more processors, correlation data using the data from the acoustic sensor and the data from the imaging sensor;
determining, by the one or more processors, observations of the road actors traversing the roadway using the data from the acoustic sensor and the data from the imaging sensor; and training, by the one or more processors, a machine-learning model to estimate characteristics of the road actors using the correlation data and the determined observations of the road actors from the imaging sensor and the acoustic sensor,
wherein generating the correlation data using the data from the acoustic sensor and the data from the imager sensor further comprises:
generating, by the one or more processors, joint correlation data for modeling an environment of the road actors traversing the roadway using (i) the data from the acoustic sensor at the first location, (ii) the data from the imaging sensor at the second location, and (iii) the observations of the road actors traversing the roadway, the joint correlation data indicating (i) first characteristics of the road actors at the first location not in a field of view of the imaging sensor, (ii) second characteristics of the road actors at the second location not in a field of view of the acoustic sensor, and (iii) third characteristics of the road actors at a third location in a field of view of both the acoustic sensor and the imaging sensor.

13. The system of claim 12, wherein the first location is different from the second location.

14. The system of claim 12, wherein the first location is similar to the second location.

15. The system of claim 12, wherein obtaining data from the acoustic sensor monitoring the road actors further comprises:
receiving, by the one or more processors, first acoustic data from a first acoustic sensor at a first time; and
receiving, by the one or more processors, second acoustic data from a second acoustic sensor at a second time.

16. The system of claim 15, wherein a difference between the first time and the second time represents (i) a distance between the first acoustic sensor and the second acoustic sensor on the roadway and (ii) a speed at which the road actor moves on the roadway between the first acoustic sensor and the second acoustic sensor.

17. The system of claim 15, wherein the first acoustic data represents a sound profile of the road actor at the first time and the second acoustic data represents the sound profile of the road actor at the second time.

18. The system of claim 12, wherein the imaging sensor comprises at least one of a LIDAR system, a RADAR system, and a camera.

19. A non-transitory computer-readable medium storing software comprising instructions executable by one or more computers which, upon such execution, cause the one or more computers to perform operations comprising:
obtaining, by one or more processors, data from an acoustic sensor monitoring road actors traversing a roadway at a first location;
obtaining, by the one or more processors, data from an imaging sensor monitoring the road actors traversing the roadway at a second location;
generating, by the one or more processors, correlation data using the data from the acoustic sensor and the data from the imaging sensor;
determining, by the one or more processors, observations of the road actors traversing the roadway using the data from the acoustic sensor and the data from the imaging sensor; and training, by the one or more processors, a machine-learning model to estimate characteristics of the road actors using the correlation data and the determined observations of the road actors from the imaging sensor and the acoustic sensor,
wherein generating the correlation data using the data from the acoustic sensor and the data from the imager sensor further comprises:
generating, by the one or more processors, joint correlation data for modeling an environment of the road actors traversing the roadway using (i) the data from the acoustic sensor at the first location, (ii) the data from the imaging sensor at the second location, and (iii) the observations of the road actors traversing the roadway, the joint correlation data indicating (i) first characteristics of the road actors at the first location not in a field of view of the imaging sensor, (ii) second characteristics of the road actors at the second location not in a field of view of the acoustic sensor, and (iii) third characteristics of the road actors at a third location in a field of view of both the acoustic sensor and the imaging sensor.

* * * * *